ELECTRICAL CAPACITOR AND DIELECTRIC MATERIAL THEREFOR
Filed Oct. 31, 1967
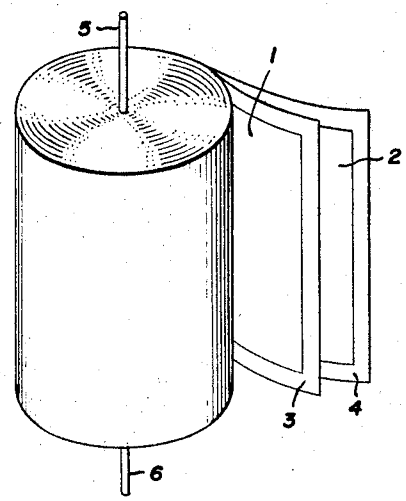
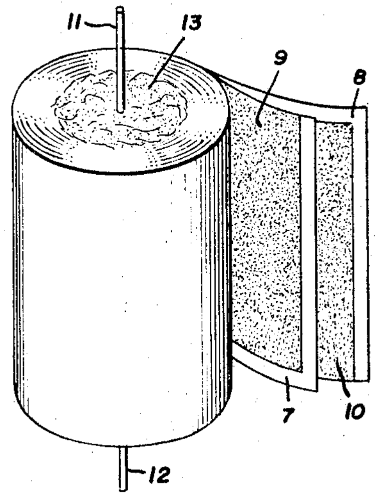
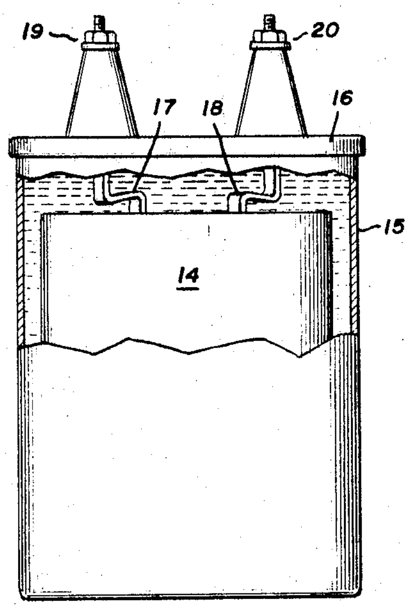
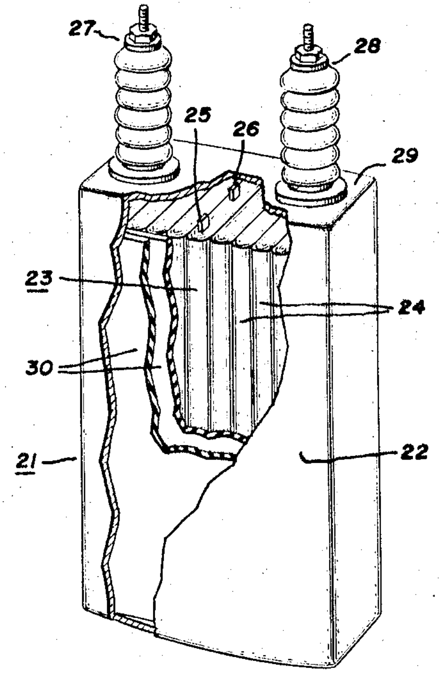
INVENTOR:
ARTHUR KATCHMAN,
BY James J. Lichiello
HIS ATTORNEY.

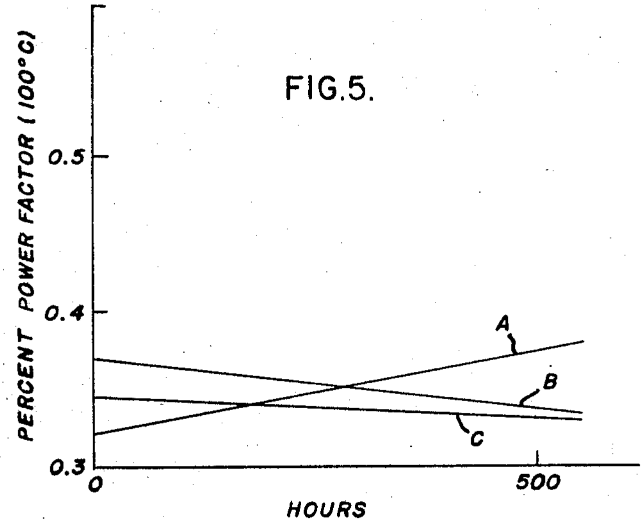
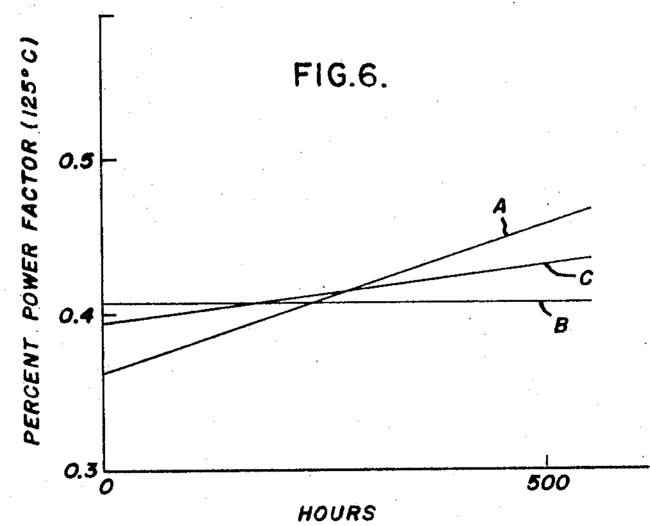
INVENTOR:
ARTHUR KATCHMAN,
BY James J. Lichiello
HIS ATTORNEY.

3,424,957
Patented Jan. 28, 1969

3,424,957

ELECTRICAL CAPACITOR AND DIELECTRIC MATERIAL THEREFOR

Arthur Katchman, Pittsfield, Mass., assignor to General Electric Company, a corporation of New York Filed Oct. 31, 1967, Ser. No. 679,408
U.S. Cl. 317—259 14 Claims
Int. Cl. H01b *3/24;* H01g *1/00*

ABSTRACT OF THE DISCLOSURE

An electrical device including capacitors has a liquid dielectric. The dielectric is a halogenated aromatic liquid which has incorporated therein bis(2,3-epoxycyclopentyl ether) which acts as a scavenger for halogen-containing degradation products.

BACKGROUND OF THE INVENTION

*Field of the invention*

The present invention relates generally to an improved dielectric liquid composition and more particularly to electrical apparatus incorporating an improved dielectric liquid.

DESCRIPTION OF THE PRIOR ART

Halogenated aromatic compounds have been extensively used as dielectric liquid impregnant media in electrical apparatus such as electrical capacitors, cables, and transformers etc. to improve dielectric strength of the insulating materials as well as for cooling purposes. These compounds having a decided advantage over mineral oil impregnants by having higher dielectric constants and being generally non-flammable. A difficulty attends their use in that decomposition products particularly hydrogen chloride, often form, which adversely affect the properties of the dielectric liquid and otherwise lead to the degradation of the apparatus. To overcome this problem, scavenger materials have been incorporated in the dielectric liquid for removing or neutralizing the effect of the hydrogen chloride and other decomposition products. However, the known scavenger materials heretofore employed for this purpose have had various drawbacks, such as reacting too slowly with the decomposition products, or adversely affecting the properties of the dielectric liquid, especially in terms of increasing power factor at elevated temperatures in the operation of the apparatus, such as capacitors, in which the dielectric liquid is incorporated.

SUMMARY OF THE INVENTION

It is therefore an object of the invention to provide an improved halogenated aromatic dielectric composition for electrical apparatus, especially electrical capacitors, having incorporated therein a novel scavenger material.

It is another object of the invention to provide electrical capacitors utilizing a halogenated aromatic dielectric liquid having an improved scavenger material incorporated therein which provides improved electrical properties, and particularly power factor characteristics, under high temperature conditions and over a prolonged period.

Other objects and advantages will become apparent and the invention will be better understood from the following description and appended claims.

In accordance with the foregoing objects, the present invention provides in one of its broadest forms an improved halogenated aromatic dielectric liquid composition containing a bis(2,3-epoxycyclopentyl ether) scavinger material. It has been found that this scavenger material is particularly effective in concentrations of from about 0.01 to about 5% by weight, and preferably from about 0.1 to 1% by weight. This material is utilized in electrical apparatus, generally, which have an insulating medium or dielectric appropriate for impregnation, for example, capacitors, cables and transformers. A specific embodiment of the present invention comprises an electrical capacitor utilizing the scavenger containing dielectric liquid composition.

BRIEF DESCRIPTION OF THE DRAWINGS

FIGURE 1 illustrates an electrical capacitor roll, unit or section to which the present invention is particularly applicable;

FIGURE 2 illustrates a different embodiment of electrical capacitor roll, unit or section to which the present invention may be applied;

FIGURE 3 illustrates an encased capacitor roll in which the invention may be embodied;

FIGURE 4 illustrates an electrical multi-roll power capacitor embodying the present invention; and FIGURES 5 and 6 present a graphical showing of the high temperature power factor characteristics of electrical capacitors containing the dielectric liquid composition of the present invention.

DESCRIPTION OF THE PREFERRED EMBODIMENTS

Referring now to the drawings and particularly to FIGURE 1, there is shown a capacitor roll comprising a pair of convolutely wound electrode foils 1 and 2 of suitable metal, e.g., aluminum, insulated from each other by separate sheets 3 and 4 of suitable dielectric material, such as kraft paper, plastic film or other porous or non-porous impregnatable dielectric spacer material. Electrical contact to electrode foils 1 and 2 is made by terminal leads 5, 6 of electrically conducting material, which are applied to the respective foil electrodes and project from opposite ends of the wound capacitor section.

In a different form of capacitor roll as shown in FIGURE 2, and in which the invention provides notable advantages, the wound capacitor section comprises a pair of convolutely wound dielectric films 7, 8 of suitable insulating materials such as cellulosic paper, plastic films, and the like, films 7, 8 having metallized coatings 9, 10 respectively thereon serving as the capacitor electrodes. The metallized electrode coatings may be composed of aluminum or any other suitable conducting materials such as tin, silver, copper, lead, zinc, or nonmetallic solid conductive material such as carbon, and may be applied by any metallizing or other suitable depositing techniques. A satisfactory metal coating may be produced, for example, by vacuum evaporation of the desired metal, or by sputtering, dipping, painting, chemical deposition, or the like. As shown, the margins of the opposite edges and the ends of dielectric films 7, 8 are left free of metal coating to avoid the risk of short-circuiting between the electrodes of opposite polarity. Terminals 11, 12 are electrically connected to the metallized coating edges exposed at opposite ends of the roll by a metal connection 13 produced by schooping, soldering, or other suitable process, as is well known in the art.

As applied to capacitor rolls of the metallized electrode type as shown in FIGURE 2, the invention is distinctive in making it now more advantageous to use metallized electrodes, with their attendant benefits of self-clearing properties, in combination with dielectric liquids of halogenated aromatic composition. The self-clearing effect is caused by momentary current increases taking place in the locality of defects in the dielectric spacer materials which causes the metal electrode layer to burn away in that locality and restore the dielectric strength in that region. However, in the absence of an effective scavenging material such as that of the present invention, halogen-containing degradation products are generated when the electrode clearing occurs which are injurious to the thin electrode layer as well as to the dielectric liquid and the dielectric spacer material, and other components of the capacitor. By employing the present invention, there is thus provided more effective metallized electrode capacitors which have small relative volume and the benefits of self-clearing, as described.

FIGURE 3 shows a capacitor assembly in which a wound capacitor roll 14, such as the wound rolls shown in FIGURES 1 and 2, is enclosed in a casing 15 containing a dielectric liquid 16 impregnating the rolled capacitor section. Dielectric liquid 16 is of halogenated aromatic composition and has a scavenger material incorporated therein of a composition as more fully described below. Tap straps 17, 18 connected within the capcitor roll to electrodes of different polarity are respectively connected to external terminals 19, 20 suitably mounted on the cover of the casing.

FIGURE 4 illustrates a multi-roll power capacitor 21 comprising a rectangular metal container or casing 22 containing capacitor pack 23 made up of a plurality of flattened rolls 24, such as the wound rolls shown in FIGURES 1 and 2. Each roll 24 has electrode terminal tabs 25 and 26 connected to the respective electrode foils which may project from the upper ends of the capacitor roll. The terminal tabs are suitably electrically connected to leads (not shown) which extend through terminal bushings 27 and 28 mounted on cover 29. Instead of having terminal tabs as described, the capacitor rolls may be of exposed foil arrangement well-known in the art, in which the foil armatures project from opposite ends of the roll and leads are suitably attached to the exposed foils. Capacitor pack 23 is wrapped in a covering of insulating material 30, referred to herein as major insulation, such as one or more layers of kraft paper, which separates pack 23 from metal casing 22. Casing 22 is hermetically sealed by cover 29 and contains a dielectric liquid of a halogenated aromatic composition incorporating a scavenger material therein, in accordance with the present invention, in which capacitor pack 23 is immersed and which impregnates the dielectric paper sheets thereof.

In accordance with the invention, the halogenated aromatic dielectric liquid, in one form as trichlorodiphenyl, has incorporated therein a diepoxide compound comprising bis (2,3 epoxycyclopentyl ether) having the following structural formula;

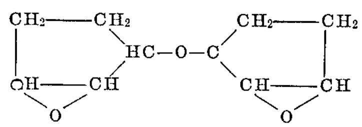

Isomeric bis(2,3 epoxycyclopentyl ethers) are commercially available as ERRA–0300, a white solid, and as ERLA–0400, an amber liquid, from the Union Carbide Corporation.

The diepoxides not only provide marked improvement in protecting the electrical capacitor from the effects of decomposition products of the halogenated aromatic dielectric compound, but also unexpectedly improve and stabilize the high temperature power factor of the capacitor.

Life tests were conducted on capacitors incorporating the dielectric liquid composition of the invention and compared with another group of capacitors, serving as a control, incorporating the same dielectric liquid without any diepoxide stabilizer. The capacitors were constructed of wound sections of aluminum foil electrodes separated by two sheets of 0.4 mil paper and impregnated with the appropriate dielectric liquid in small amounts as shown in Table I below. The capacitors were rated at 4$\mu$f and 300 VAC.

TABLE I

| Group | Dielectric composition |
|---|---|
| 1 | Control-trichlorodiphenyl. |
| 2 | Trichlorodiphenyl+0.1% ERRA–0300 diepoxide. |
| 3 | Trichlorodiphenyl+0.5% ERLA–0400 diepoxide. |

Each of the three groups of capacitors were subjected to identical life test conditions of 85° C. at 880 VAC for 100 hours followed by 85° C. at 660 VAC for about 400 hours. High temperature power factor measurements were made at the beginning of and at the completion of the life testing. The results are listed in Table II.

TABLE II

| Group | Percent power factor | | | |
|---|---|---|---|---|
| | 100° C. | | 125° C. | |
| | Initial | Final | Initial | Final |
| 1 | .318 | .380 | .364 | .468 |
| 2 | .370 | .338 | .416 | .406 |
| 3 | .347 | .336 | .393 | .427 |

FIGURES 5 and 6 are graphical illustrations of the foregoing data at 100° C. and 125° C. respectively. In the graph the percent power factor is plotted against the life test period in hours. Curve A represents the trichlorodiphenyl dielectric liquid without any diepoxide stabilizer and serves as the control. Curve B represents the trichlorodiphenyl stabilized with ERRA–0300 diepoxide and Curve C represents the trichlorodiphenyl stabilized with ERLA–0400.

As is evident from the graphs of FIGURES 5 and 6, the bis (2,3 epoxycyclopentyl ether) scavenger additions to the dielectric liquid significantly improves the high temperature power factor over the long operating life of the capacitors. It is particularly significant that compared to the control dielectric the relative power factor of the diepoxide containing dielectric decreases with increasing life. This result was further unexpected in that, typically, higher power factors are produced by higher concentrations of decomposition products, which generally increase in concentration with increased life. Thus a major contributing factor to shortening the operating life of capacitors is reduced or eliminated. It is also noteworthy that the power factor of capacitors utilizing diepoxide containing dielectric liquids is more stable than the power factor of capacitors containing unstabilized trichlorodiphenyl.

Another aspect of particular significance can be seen from FIGURE 5 where it is noted that the absolute values of the power factor for Curves B and C continue to decrease with increasing life of the capacitor. This represents a marked improvement over even the most recent advances in dielectric liquids incorporating scavenger materials. Although the power factor of the control dielectric, Curve A, is initially better than the power factor of the diepoxide containing dielectrics, the power factor of the latter continues to improve whereas the former gets progressively worse. Thus, after a short time, capacitors incorporating the dielectric liquid composition of the present invention exhibit a more favorable 100° C. power factor than can be obtained with capacitors utilizing conventional trichlorodiphenyl dielectric liquid without the diepoxide additive, even though initially the trichlorodiphenyl capacitor without the diepoxide additive was better.

It has been found that capacitors incorporating the diepoxide scavenger material exhibit better power factor characteristics at elevated temperature than those with other epoxide scavengers. Comparative tests were conducted at 100° C. and 125° C. on identical wound type capacitors, wherein capacitors containing 1-epoxyethyl-3, 4-epoxycyclohexane were operated under the same life condition as the capacitors of Groups 2 and 3 of Table I. It was found that the diepoxide capacitors of the present invention had generally lower initial power factors and consistently lower power factors after about 500 hours of operation. In fact, at 100° C. at the conclusion of testing, the 1-epoxyethyl-3, 4-epoxycyclohexane capacitors showed an average percent power factor increase over the test life of about 15% whereas the Group 2 and 3 diepoxide capacitors showed an average percent power factor decrease of about 9% and 3% respectively. Similarly, at 125° C., the 1-epoxyethyl-3, 4-epoxycyclohexane capacitors showed an average percent power factor increase over the test life of about 14% whereas Group 2 capacitors showed about a 2.5% decrease and Group 3 capacitors only a 7.5% increase.

In general, the diepoxide scavenger may be used in a range of about .01% to 5% by weight, with a preferred range for optimum purposes being about .1 to 1% by weight. The halogenated aromatic compounds in which the described epoxide scavenger may be used may be of various compositions, as for example, the trichlorodiphenyl previously mentioned, pentachlorodiphenyl, hexachlorodiphenyl, trichlorobenzene, tetrachlorobenzene, and mixtures thereof.

In addition to the above advantages, the diepoxides exhibit relatively high speed of reaction with the decomposition products, as compared to known scavenger compounds, including epoxides such as phenoxypropylene oxide alone or in combination with an accelerating catalyst such as an amine.

By virtue of the improved power factor characteristics of capacitors constructed in accordance with the invention, such capacitors have considerably improved life especially under high temperature conditions, and such desirable advantages are obtained without sacrifice of the other electrical properties such as capacitance, which remains stable over wide temperature ranges.

While the present invention has been described with reference to particular embodiments thereof, it will be understood that numerous modifications may be made by those skilled in the art without actually departing from the scope of the invention.

What we claim as new and desire to secure by Letters Patent of the United States is:

1. A dielectric composition comprising a halogenated aromatic dielectric liquid containing bis(2,3-epoxycyclopentyl ether).

2. A dielectric composition, as claimed in claim 1, wherein said bis(2,3-epoxycyclopentyl ether) concentration is from about 0.01 to about 5% by weight.

3. A dielectric composition, as claimed in claim 2, wherein said bis(2,3-epoxycyclopentyl ether) concentration is from about 0.1 to about 1% by weight.

4. A dielectric composition, as claimed in claim 3, wherein said halogenated aromatic dielectric liquid is a chlorinated diphenyl.

5. Electrical apparatus comprising a container, an electrical device in said container, and a dielectric liquid in said container, said dielectric liquid comprising a halogenated aromatc dielectric liquid containing bis(2,3-epoxycyclopentyl ether).

6. Electrical apparatus, as claimed in claim 5, wherein said bis(2,3-epoxycyclopentyl ether) concentration is from about 0.01 to about 5.0% by weight.

7. Electrical apparatus, as claimed in claim 5, wherein said electrical device is an electrical capacitor section.

8. An electrical capacitor comprising electrodes and a dielectric liquid interposed between said electrodes, said dielectric liquid comprising a halogenated aromatic dielectric liquid containing bis(2,3-epoxycyclopentyl ether).

9. An electrical capacitor, as claimed in claim 8, wherein said bis(2,3-epoxycyclopentyl ether) concentration is from about 0.01 to about 5% by weight.

10. An electrical capacitor, as claimed in claim 9, wherein said halogenated aromatic dielectric liquid is trichlorodiphenyl.

11. An electrical capacitor, as claimed in claim 9, wherein a dielectric spacer is interposed between said electrodes.

12. An electrical capacitor, as claimed in claim 11, wherein said dielectric spacer comprises at least one film of dielectric resin material, and at least one of said electrodes is in the form of a thin metallized coating on said dielectric material.

13. An electrical capacitor, as claimed in claim 11, wherein said capacitor is convolutely wound and comprises alternating layers of metallic electrode foils and dielectric spacer.

14. Electrical apparatus comprising electrode means, a dielectric material adjacent said electrode, and liquid containing means about said dielectric material, said dielectric material being impregnated with a halogenated aromatic dielectric liquid containing bis(2,3-epoxycyclopentyl ether).

References Cited

UNITED STATES PATENTS 3,242,402 3/1966 Stahr -------------- 317—259

LEWIS H. MYERS, *Primary Examiner.*

ELLIOT A. GOLDBERG, *Assistant Examiner.*

U.S. Cl. X.R.

252—66; 174—14